(12) United States Patent
Li et al.

(10) Patent No.: US 10,349,344 B2
(45) Date of Patent: Jul. 9, 2019

(54) NETWORK ELEMENT SELECTION METHOD AND NETWORK ELEMENT SELECTOR

(71) Applicant: Huawei Technologies Co., Ltd., Shenzhen (CN)

(72) Inventors: Yan Li, Beijing (CN); Xiaoqiang Qiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/002,023

(22) Filed: Jun. 7, 2018

(65) Prior Publication Data

US 2018/0288693 A1 Oct. 4, 2018

Related U.S. Application Data

(63) Continuation of application No. PCT/CN2015/097601, filed on Dec. 16, 2015.

(51) Int. Cl.
*H04W 48/18* (2009.01)
*H04W 24/04* (2009.01)
(Continued)

(52) U.S. Cl.
CPC .......... *H04W 48/18* (2013.01); *H04W 24/04* (2013.01); *H04W 28/08* (2013.01); *H04W 88/14* (2013.01)

(58) Field of Classification Search
CPC ..... H04W 48/18; H04W 24/04; H04W 28/08; H04W 88/14
(Continued)

(56) References Cited

U.S. PATENT DOCUMENTS

2005/0013281 A1 1/2005 Milton et al.
2011/0235505 A1 9/2011 Eswara et al.
(Continued)

FOREIGN PATENT DOCUMENTS

CN 101247634 A 8/2008
CN 101400084 A 4/2009
(Continued)

OTHER PUBLICATIONS

Zhang et al.,"Service Chain Header draft-zhang-sfc-sch-03", Network Working Group, Internet-Draft, XP015103723, dated Dec. 23, 2014,total 18 pages.

*Primary Examiner* — Mong-Thuy T Tran
(74) *Attorney, Agent, or Firm* — Leydig, Voit & Mayer, Ltd.

(57) ABSTRACT

A network element selection method and a network element selector are provided. The network element selection method includes: receiving, by a network element selector, a request message sent by a base station, where the request message includes information about user equipment UE and a service chain head, the service chain head includes a session index, and the session index is empty or the session index is allocated by a first controller serving the UE; determining, by the network element selector based on the session index, a controller providing a service; and sending, by the network element selector, the request message to the controller providing the service, so that the controller providing the service serves the UE. In this application, the network element selector is deployed to provide a load balance function.

15 Claims, 8 Drawing Sheets

(51) Int. Cl.
*H04W 28/08* (2009.01)
*H04W 88/14* (2009.01)

(58) Field of Classification Search
USPC ...................................................... 455/435.2
See application file for complete search history.

(56) References Cited

U.S. PATENT DOCUMENTS

| | | |
|---|---|---|
| 2011/0287743 A1 | 11/2011 | Hu et al. |
| 2015/0039763 A1* | 2/2015 | Chaudhary ........... H04L 47/125 |
| | | 709/226 |
| 2015/0092551 A1* | 4/2015 | Moisand ............. H04L 12/4633 |
| | | 370/235 |
| 2015/0222640 A1 | 8/2015 | Kumar et al. |
| 2015/0271102 A1* | 9/2015 | Antich .................. H04L 47/825 |
| | | 370/230 |
| 2015/0333930 A1* | 11/2015 | Aysola ................ H04L 63/0471 |
| | | 370/392 |
| 2015/0358235 A1* | 12/2015 | Zhang ................... H04L 45/745 |
| | | 370/230 |
| 2015/0358850 A1* | 12/2015 | La Roche, Jr. ... H04W 28/0215 |
| | | 370/328 |
| 2017/0005920 A1* | 1/2017 | Previdi ................ H04L 45/306 |
| 2017/0019302 A1* | 1/2017 | Lapiotis ................ H04L 41/145 |
| 2017/0048815 A1* | 2/2017 | Clarke .................. H04W 64/00 |

FOREIGN PATENT DOCUMENTS

| | | |
|---|---|---|
| CN | 102281532 A | 12/2011 |
| CN | 103765948 A | 4/2014 |
| EP | 3001728 B1 | 8/2017 |

* cited by examiner

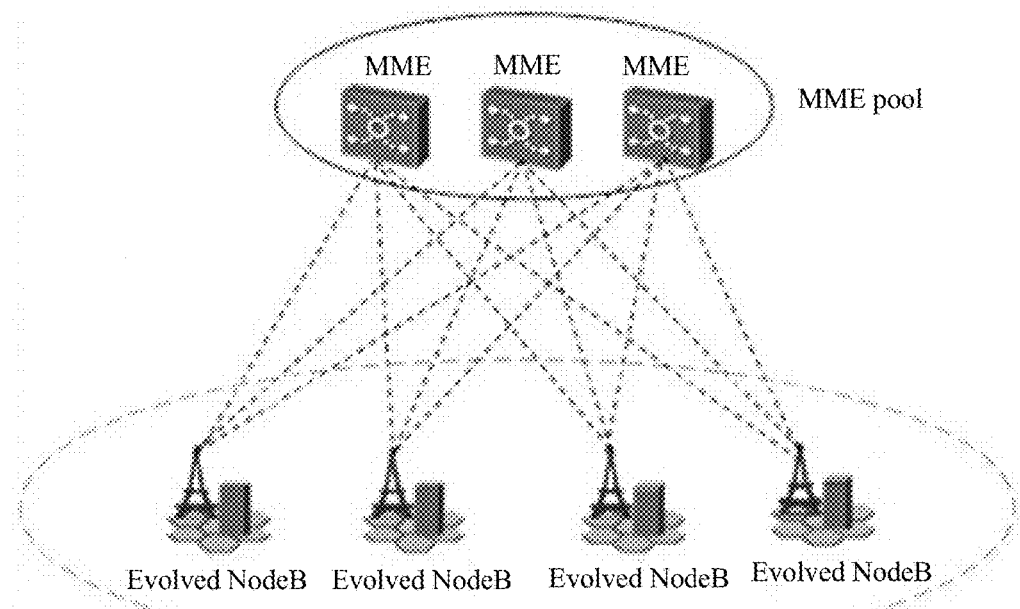

FIG. 1

```
A network element selector receives a request message sent by a base
station, where the request message includes information about user        S200
equipment UE and a service chain head, the service chain head
includes a session index, and the session index is empty or the session
index is allocated by a first controller serving the UE
```

```
The network element selector determines, based on the session index,      S201
a controller providing a service
```

```
The network element selector sends the request message to the             S202
controller providing a service, so that the controller providing a
service serves the UE
```

FIG. 2

NETWORK ELEMENT SELECTION METHOD AND NETWORK ELEMENT SELECTOR

CROSS-REFERENCE TO RELATED APPLICATIONS

This application is a continuation of International Application No. PCT/CN2015/097601, filed on Dec. 16, 2015, the disclosure of which is hereby incorporated by reference in its entirety.

TECHNICAL FIELD

Embodiments of the present disclosure relate to the field of communications technologies, and in particular, to a network element selection method and a network element selector.

BACKGROUND

With development of mobile Internet services, diversification of enterprise network services, and convergence of mobile access networks in a plurality of standards, increasingly high requirements are imposed on a core network architecture. To further simplify the core network architecture and improve network efficiency, the conventional art provides a converged controller including a control function network element of an existing core network. The converged controller includes mobility management (for example, implementing a function of a mobility management entity (MME)), session management, charging and policy management, and the like, thereby reducing control interfaces and interaction signaling. The converged controller is a control core in the core network architecture. An MME pool technology is used in System Architecture Evolution (SAE) to implement load balance and disaster backup and recovery of the converged controller. An existing pool networking mode is shown in FIG. 1. An evolved NodeB (eNodeB) is connected to all converged controllers in the pool, and the eNodeB selects an appropriate converged controller for connected UE based on a capacity and a current load capacity of each converged controller, so as to achieve an objective of load balance.

However, the existing core network architecture may ensure only limited load balance in the range of converged controllers connected to the eNodeB. For a future network architecture, as network capacity increases, load balance and disaster backup and recovery need to be implemented at a higher level, so as to improve resource utilization and reliability of the network. In addition, the eNodeB needs to directly communicate with the converged controllers to dynamically obtain a load condition feedback, which leads to relatively high costs. Further, a current network element selection method is applicable to selection of a converged controller for UE when the UE is connected, and it is difficult to implement a more flexible and dynamic load balance policy based on an actual load condition.

SUMMARY

The present disclosure provides a network element selection method and a network element selector, so that the network element selector may be deployed to provide a load balance function.

A first aspect of the present disclosure provides a network element selection method, including:
receiving, by a network element selector, a request message sent by a base station, where the request message includes information about user equipment UE and a service chain head, the service chain head includes a session index, and the session index is empty or the session index is allocated by a first controller serving the UE;
determining, by the network element selector based on the session index, a controller providing a service; and
sending, by the network element selector, the request message to the controller providing the service, so that the controller providing the service serves the UE.

With reference to the implementation of the first aspect, in a first possible implementation of the first aspect, the determining, by the network element selector based on the session index, a controller providing a service includes:
obtaining, by the network element selector from the session index, an identifier of a controller that allocates the session index, and identifying that the identifier of the controller that allocates the session index is an identifier of the first controller; and
determining, by the network element selector, that the controller providing the service is the first controller.

With reference to the implementation of the first aspect, in a second possible implementation of the first aspect, the determining, by the network element selector based on the session index, a controller providing a service includes:
determining, by the network element selector based on the session index and attribute information of each controller, the controller providing the service, where the attribute information of each controller is location information and/or load capacity information of each controller.

With reference to the second possible implementation of the first aspect, in a third possible implementation of the first aspect, the determining, by the network element selector based on the session index and attribute information of each controller, the controller providing the service includes:
identifying, by the network element selector, that the session index is empty;
obtaining, by the network element selector, the location information and/or the load capacity information of each controller;
obtaining, by the network element selector, location information of the base station; and
determining, by the network element selector, a distance between the base station and each controller based on the location information of the base station and the location information of each controller, and determining, based on the distance between the base station and each controller and/or the load capacity information, the controller providing the service.

With reference to the second possible implementation of the first aspect, in a fourth possible implementation of the first aspect, the determining, by the network element selector based on the session index and attribute information of each controller, the controller providing the service includes:
obtaining, by the network element selector from the session index, an identifier of a controller that allocates the session index, and identifying that the identifier of the controller that allocates the session index is an identifier of the first controller;
obtaining, by the network element selector, location information and/or load capacity information of the first controller;
obtaining, by the network element selector, location information of the base station;

determining, by the network element selector, a distance between the base station and each controller based on the location information of the base station and the location information of the first controller, and determining, based on the distance between the base station and each controller and/or the load capacity information, whether to use the first controller to provide the service; and if it is determined to use the first controller to provide a service, determining, by the network element selector, that the controller providing the service is the first controller; or if it is determined not to use the first controller to provide a service, obtaining, by the network element selector, location information and/or load capacity information of a controller other than the first controller; and determining, by the network element selector, a distance between the base station and the controller other than the first controller based on the location information of the base station and the location information of the controller other than the first controller, and determining, based on the distance between the base station and the controller other than the first controller and/or the load capacity information of the controller other than the first controller, the controller providing the service.

A second aspect of the present disclosure provides a network element selector, including:

a receiving module, configured to receive a request message sent by a base station, where the request message includes information about user equipment UE and a service chain head, the service chain head includes a session index, and the session index is empty or the session index is allocated by a first controller serving the UE;

a determining module, configured to determine, based on the session index received by the receiving module, a controller providing a service; and a sending module, configured to send the request message received by the receiving module to the controller that is determined by the determining module and that provides a service, so that the controller providing the service serves the UE.

With reference to the implementation of the second aspect, in a first possible implementation of the second aspect, the determining module includes:

an identification unit, configured to: obtain, from the session index, an identifier of a controller that allocates the session index, and identifying that the identifier of the controller that allocates the session index is an identifier of the first controller; and a determining unit, configured to determine that the controller providing the service is the first controller.

With reference to the implementation of the second aspect, in a second possible implementation of the second aspect, the determining module is configured to:

determine, based on the session index and attribute information of each controller, the controller providing the service, where the attribute information of each controller is location information and/or load capacity information of each controller.

With reference to the second possible implementation of the second aspect, in a third possible implementation of the second aspect, the determining module includes:

an identification unit, configured to identify that the session index is empty;

an obtaining unit, configured to obtain the location information and/or the load capacity information of each controller; where the obtaining unit is further configured to obtain location information of the base station; and a determining unit, configured to: determine a distance between the base station and each controller based on the location information of the base station and the location information of each controller, and determine, based on the distance between the base station and each controller and/or the load capacity information, the controller providing the service.

With reference to the second possible implementation of the second aspect, in a fourth possible implementation of the second aspect, the determining module includes:

an identification unit, configured to: obtain, from the session index, an identifier of a controller that allocates the session index, and identify that the identifier of the controller that allocates the session index is an identifier of the first controller;

an obtaining unit, configured to obtain location information and/or load capacity information of the first controller; where the obtaining unit is further configured to obtain location information of the base station;

a judging unit, configured to: determine a distance between the base station and each controller based on the location information of the base station and the location information of the first controller, and determine, based on the distance between the base station and each controller and/or the load capacity information, whether to use the first controller to provide the service; and a determining unit, configured to: when a judgment result of the judging unit is to use the first controller to provide the service, determine that the controller providing the service is the first controller; where the obtaining unit is further configured to: when the judgment result of the judging unit is not to use the first controller to provide the service, obtain location information and/or load capacity information of a controller other than the first controller; and the determining unit is further configured to: determine a distance between the base station and the controller other than the first controller based on the location information of the base station and the location information of the controller other than the first controller, and determine, based on the distance between the base station and the controller other than the first controller and/or the load capacity information of the controller other than the first controller, the controller providing the service.

A third aspect of the present disclosure provides a network element selector, where the network element selector includes a communications bus, an input apparatus, an output apparatus, and a processor, where the communications bus is configured to implement connection and communication between the input apparatus, the output apparatus, and the processor;

the input apparatus is configured to receive a request message sent by a base station, where the request message includes information about user equipment UE and a service chain head, the service chain head includes a session index, and the session index is empty or the session index is allocated by a first controller serving the UE;

the processor is configured to determine, based on the session index, a controller providing a service; and the output apparatus is configured to send the request message to the controller providing the service, so that the controller providing the service serves the UE.

With reference to the implementation of the third aspect, in a first possible implementation of the third aspect, that the processor determines, based on the session index, a controller providing a service includes the following:

obtaining, from the session index, an identifier of a controller that allocates the session index, and identifying that the identifier of the controller that allocates the session index is an identifier of the first controller; and determining that the controller providing the service is the first controller.

With reference to the implementation of the third aspect, in a second possible implementation of the third aspect, that the processor determines, based on the session index, a controller providing a service includes the following:

determining, based on the session index and attribute information of each controller, the controller providing the service, where the attribute information of each controller is location information and/or load capacity information of each controller.

With reference to the second possible implementation of the third aspect, in a third possible implementation of the third aspect, that the processor determines, based on the session index and attribute information of each controller, the controller providing the service includes the following:

identifying that the session index is empty;

obtaining the location information and/or the load capacity information of each controller;

obtaining location information of the base station; and determining a distance between the base station and each controller based on the location information of the base station and the location information of each controller, and determining, based on the distance between the base station and each controller and/or the load capacity information, the controller providing the service.

With reference to the second possible implementation of the third aspect, in a fourth possible implementation of the third aspect, that the processor determines, based on the session index and attribute information of each controller, the controller providing the service includes the following:

obtaining, from the session index, an identifier of a controller that allocates the session index, and identifying that the identifier of the controller that allocates the session index is an identifier of the first controller;

obtaining location information and/or load capacity information of the first controller;

obtaining location information of the base station;

determining a distance between the base station and each controller based on the location information of the base station and the location information of the first controller, and determining, based on the distance between the base station and each controller and/or the load capacity information, whether to use the first controller to provide the service; and if it is determined to use the first controller to provide a service, determining that the controller providing the service is the first controller; or if it is determined not to use the first controller to provide a service, obtaining location information and/or load capacity information of a controller other than the first controller; and determining a distance between the base station and the controller other than the first controller based on the location information of the base station and the location information of the controller other than the first controller, and determining, based on the distance between the base station and the controller other than the first controller and/or the load capacity information of the controller other than the first controller, the controller providing the service.

According to the present disclosure, the network element selector receives the request message sent by the base station, where the request message includes the information about the user equipment UE and the service chain head, and the service chain head includes the session index, and the session index is empty or the session index is allocated by the first controller serving the UE; the network element selector determines, based on the session index, the controller providing the service; and the network element selector sends the request message to the controller providing the service, so that the controller providing the service serves the UE. An independent network element selector is a network element of a core network, and has relatively low costs in obtaining a current attribution condition of each controller. Therefore, system consumption can be reduced to support more dynamic and flexible controller load balance for all core networks.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a diagram of an architecture of an existing core network;

FIG. 2 is a schematic flowchart of a network element selection method according to an embodiment of the present disclosure;

DESCRIPTION OF EMBODIMENTS

Figure 3:
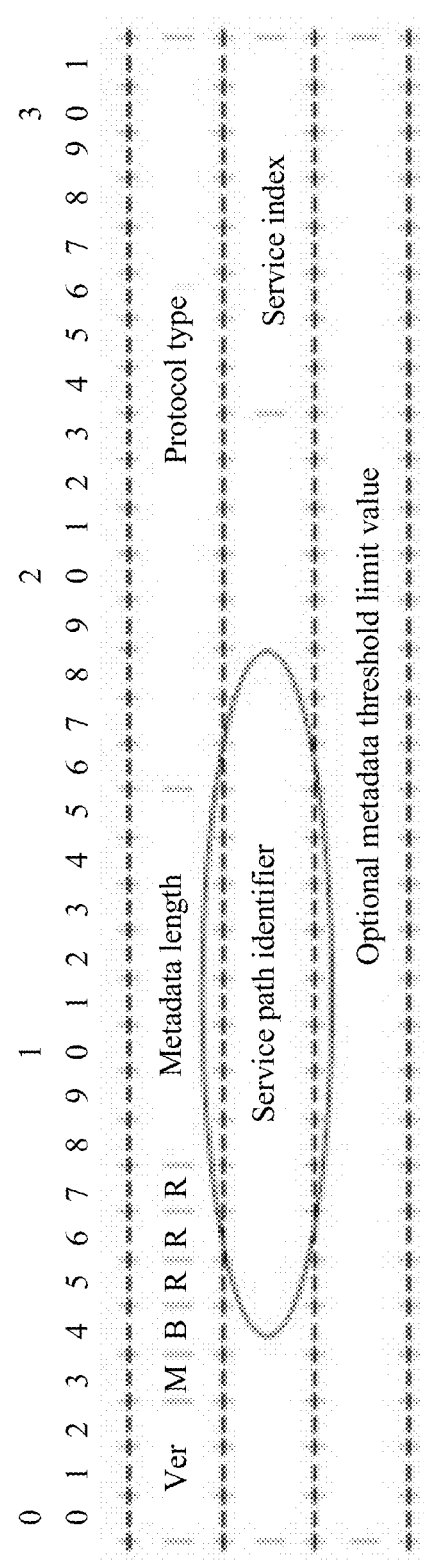
FIG. 3 is a schematic diagram of a service chain head according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a network element selection method and a network element selector, and the network element selector may be deployed to provide a load balance function.

In the embodiments of the present disclosure, a controller may be a converged controller. The following uses the converged controller as a controller for detailed description.

In the embodiments of the present disclosure, the network element selector is configured to: receive a request message sent by a base station, read a session index carried in a service chain head of the request message sent by the base station, and determine, based on the session index and pre-obtained attribute information of each converged controller, a converged controller providing a service. Related apparatus and devices are as follows:

User Equipment (UE): The UE herein includes a mobile phone, an intelligent terminal, a multimedia device, a streaming media device, a mobile Internet device (MID), a wearable device (such as a smartwatch (for example, an iwatch), a smart band, and a pedometer), or another terminal device that may communicate with the base station.

Base station: A wireless base station in an Long Term Evolution (LTE) network, which is a unique network element of an LTE radio access network, and is responsible for implementing all functions related to an air interface.

Controller: A converged controller, which is a control network element in a core network architecture, and is responsible for processing all control signaling, including mobility management, session management, policy and charging management, and the like.

Network element selector, which may be deployed in a single service domain to implement selection and load balance of a converged controller in the service domain, or may be deployed independent of the service domain to be responsible for implementing selection and load balance functions of a converged controller across a service domain.

User context database server (DB Server), which is configured to store related data of a user, including status information, load information, and the like.

User local data cache, which synchronizes user context data to local cache, so as to improve data access efficiency of a converged control plane.

In most enterprise-class applications and e-commerce application systems, UE and a converged controller usually complete a transaction or a service after a plurality of interaction processes. These interaction processes are closely related to a user identity. In addition, when performing a step of these interaction processes, the converged controller usually needs to learn a processing result of a last interaction process, or results of several previous interaction processes. Therefore, an application request related to the UE usually needs to be forwarded to a converged controller for processing rather than being forwarded to different converged controllers by the network element selector for processing. To satisfy the foregoing requirements, the network element selector needs to identify relevance of interaction processes between the UE and the converged controller. When performing load balance, the network element selector further ensures that a series of related access requests may be allocated to a same converged controller. This mechanism is referred to as session holding. Therefore, after the converged controller providing a service allocates the session index to the UE, the UE carries the session index in each interaction process afterwards. The network element selector may send requests of a same user to a same converged controller based on the session index, so as to implement the session holding.

Referring to FIG. 2, FIG. 2 is a schematic flowchart of a network element selection method according to an embodiment of the present disclosure. This embodiment of the present disclosure is applicable to related requests that are periodically sent after the UE is connected or an MME is connected.

As shown in FIG. 2, a network element selection method according to an embodiment of the present disclosure may include the following steps.

S200. A network element selector receives a request message sent by a base station, where the request message includes information about user equipment UE and a service chain head, the service chain head includes a session index, and the session index is empty or the session index is allocated by a first controller serving the UE.

In specific implementation, the UE sends a request to the base station, and the base station identifies that the received request is information about the UE, and sets a session index corresponding to the UE. The session index is empty or is allocated by a first controller serving the UE. If the session index is empty, it indicates that a current request of the UE is connecting, and a converged controller serving the UE does not exist; or if the session index is allocated by the first controller serving the UE, an identifier that is stored in the session index and that is of a controller allocating the session index is an identifier of the first controller, and it indicates that the current base station learns that a converged controller currently serving the UE is the first controller. Therefore, the base station sets the session index based on a current connection condition of the UE, where the session index is carried in the service chain head, generates the request message based on the service chain head and the information about the UE, and finally sends the request message to the network element selector.

In a possible implementation, the request message generated by the base station may be encapsulated by using a service chain (SFC).

In a possible implementation, a setting manner of the service chain head may be shown in FIG. 3. A Service Path Identifier field in the service chain head is used to store the session index, thereby implementing session holding function. In FIG. 3, the service chain head includes Metadata Length, Protocol Type, Service Index, Optional Metadata threshold limit value (TLVs), and the like. Other parameters in FIG. 3 are components of a service chain head in the conventional art. Details are not described in this embodiment.

S201. The network element selector determines, based on the session index, a controller providing a service.

In specific implementation, the network element selector determines, based on the session index, a converged controller providing a service.

In a possible implementation, the network element selector may further determine, based on the session index and attribute information of each converged controller, the converged controller providing a service. The network element selector obtains the attribute information of each converged controller, where the attribute information of each converged controller includes location information and/or load capacity information of each converged controller, so as to obtain a location deployment condition and a load condition of each converged controller. Finally, the network element selector determines, with reference to the session index and the attribute information of each converged controller, the converged controller providing a service.

S202. The network element selector sends the request message to the controller providing the service, so that the controller providing the service serves the UE.

In specific implementation, the network element selector removes the service chain head, and forwards the request message carrying the information about the UE to the converged controller providing a service, so that the converged controller providing a service receives the information about the UE forwarded by the network element selector, and enables a specific operation serving the UE.

In a possible implementation, the converged controller providing a service may establish or update a context for the UE in Local Data Cache (user local data cache) of a corresponding service domain, obtain related data of the UE from a user context DB server, and allocate the session index to the UE. The converged controller providing a service sends a response message related to the UE to the network element selector, and the network element selector forwards the response message to the base station, so that the base station learns that the converged controller determined by the network element selector serves the UE.

In a possible implementation, the response message may be an S1 application protocol (S1-AP) message. The message includes Controller S1-AP UE ID, and Controller S1-AP UE ID is used as the session index. The base station reads Controller S1-AP UE ID to obtain the session index, and further stores the session index as the context of the UE, so as to continue an interaction process of the UE.

In a possible implementation, a GUTI parameter that is allocated by the controller providing the service to the UE or a controller identifier (Controller ID) may be used as the session index. The UE notifies the base station, and therefore, the base station obtains a session index providing a service, and further stores the session index as the context of the UE, so as to continue the interaction process of the UE.

According to this embodiment of the present disclosure, the network element selector receives the request message sent by the base station, where the request message includes the information about the user equipment UE and the service chain head, the service chain head includes the session index, and the session index is empty or the session index is allocated by the first controller serving the UE; the network element selector determines, based on the session index, the controller providing the service; and the network element selector sends the request message to the controller providing the service, so that the controller providing the service serves the UE. An independent network element selector is a network element of a core network, and has relatively low costs in obtaining a current attribution condition of each controller. Therefore, system consumption can be reduced to support more dynamic and flexible controller load balance for all core networks.

Figure 4:
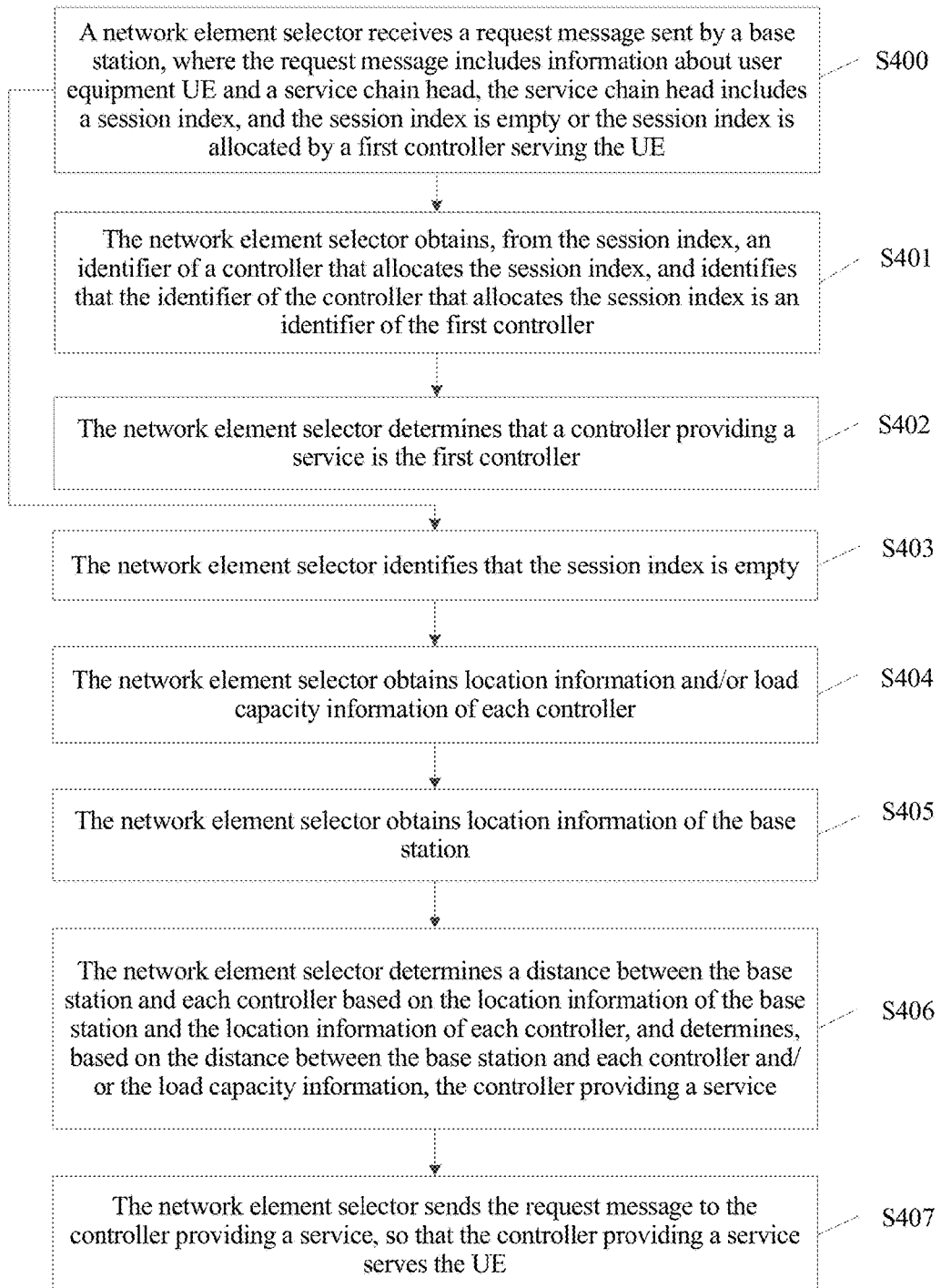
FIG. 4 is a schematic flowchart of a network element selection method according to an embodiment of the present disclosure.

Referring to FIG. 4, FIG. 4 is a schematic flowchart of a network element selection method according to an embodiment of the present disclosure. The embodiments of the present disclosure are applicable to connection requests that are periodically sent after UE is connected or an MME is connected. However, in this embodiment, UE initial access is used as an example for description.

S400. A network element selector receives a request message sent by a base station, where the request message includes information about user equipment UE and a service chain head, the service chain head includes a session index, and the session index is empty or the session index is allocated by a first controller serving the UE.

In specific implementation, the UE sends the information about the UE to the base station. The information about the UE includes an international mobile subscriber identity (IMSI) that is used to uniquely identify the UE. The base station identifies, based on the request message, that the received message is the information about the UE, and sets a session index corresponding to the UE. The UE is performing initial access, currently no converged controller is serving the UE, and therefore, the base station sets the session index to be empty. The base station carries the session index in the service chain head, generates the request message based on the service chain head and the information about the UE, and finally sends the request message to the network element selector.

In a possible implementation, the session index may be set to be empty (that is, a value of a controller identifier (Controller ID) is 0), or to be an identifier of a first controller currently serving the UE.

S401. The network element selector obtains, from the session index, an identifier of a controller that allocates the session index, and identifies that the identifier of the controller that allocates the session index is an identifier of the first controller.

In specific implementation, if the network element selector obtains, from the session index, the identifier of the controller that allocates the session index, it indicates that currently the controller is serving the UE. Therefore, the network element selector may perform identification on the identifier of the controller that allocates the session index, and identify that the identifier of the controller that allocates the session index is the identifier of the first controller.

S402. The network element selector determines that a controller providing a service is the first controller.

In specific implementation, the network element selector may directly determine that the controller providing the service is the first controller, and instructs the first controller to continuously serve the UE.

S403. The network element selector identifies that the session index is empty.

In specific implementation, if the network element selector identifies that the session index is empty, the network element selector determines, based on attribute information of each controller, the controller providing the service, where the attribute information of each controller is location information and/or load capacity information of each controller. Specifically, after receiving the request message sent by the base station, the network element selector obtains the session index from a Service Path ID field in the service chain head of the request message, identifies the value of the controller identifier in the session index, and if it is identified that the value of the controller identifier is 0, learns that the session index is empty. This indicates that currently no converged controller is serving the UE.

S404. The network element selector obtains location information and/or load capacity information of each controller.

In specific implementation, currently no converged controller is serving the UE, and therefore, the network element selector needs to allocate a converged controller to the UE. The network element selector may obtain location information and/or load capacity information of a converged controller in each service domain, so as to obtain a location deployment condition and/or a load condition of each converged controller. The network element selector may use the location information of each converged controller to determine a converged controller serving the UE, and learn the location information of each converged controller to obtain a specific location of each converged controller, so as to find a converged controller that has a shortest distance to the UE or a converged controller that can communicate with the UE in a service domain to which the converged controller belongs. The network element selector may further use the load capacity information of each converged controller to determine the converged controller serving the UE, and use the load condition of each converged controller to learn a current load pressure of each converged controller, so as to identify impact on another network element when a converged controller is faulty or a faulty converged controlled is shielded across a domain. The network element selector allocates, in converged controllers whose load pressures are within a load pressure threshold, a converged controller with a minimum load pressure to serve the UE. By integrating with a flexible management function of the converged controller, the network element selector implements an auto scaling policy based on the load condition. The network element selector may further use both the location information and the load capacity information of each converged controller to determine the converged controller serving the UE. For example, the network element selector may select a converged controller whose distance to the UE is less than a preset distance value and whose load capacity is less than a preset load pressure to serve the UE.

S405. The network element selector obtains location information of the base station.

In specific implementation, if the network element selector determines, based on the location information of each converged controller, or based on the location information and the load capacity information of each converged controller, the converged controller serving the UE, the network element selector needs to obtain the location information of the base station, so as to determine an actual physical distance between the base station and each converged controller.

S406. The network element selector determines a distance between the base station and each controller based on the location information of the base station and the location information of each controller, and determines, based on the distance between the base station and each controller and/or the load capacity information, the controller providing the service.

In specific implementation, the network element selector calculates, based on the location information of the base station and the location information of each converged controller, the actual physical distance between the base station and each converged controller, and determines, based on the actual physical distance between the base station and each converged controller and/or the load capacity information of each converged controller, the converged controller providing a service.

S407. The network element selector sends the request message to the controller providing the service, so that the controller providing the service serves the UE.

Figure 5:
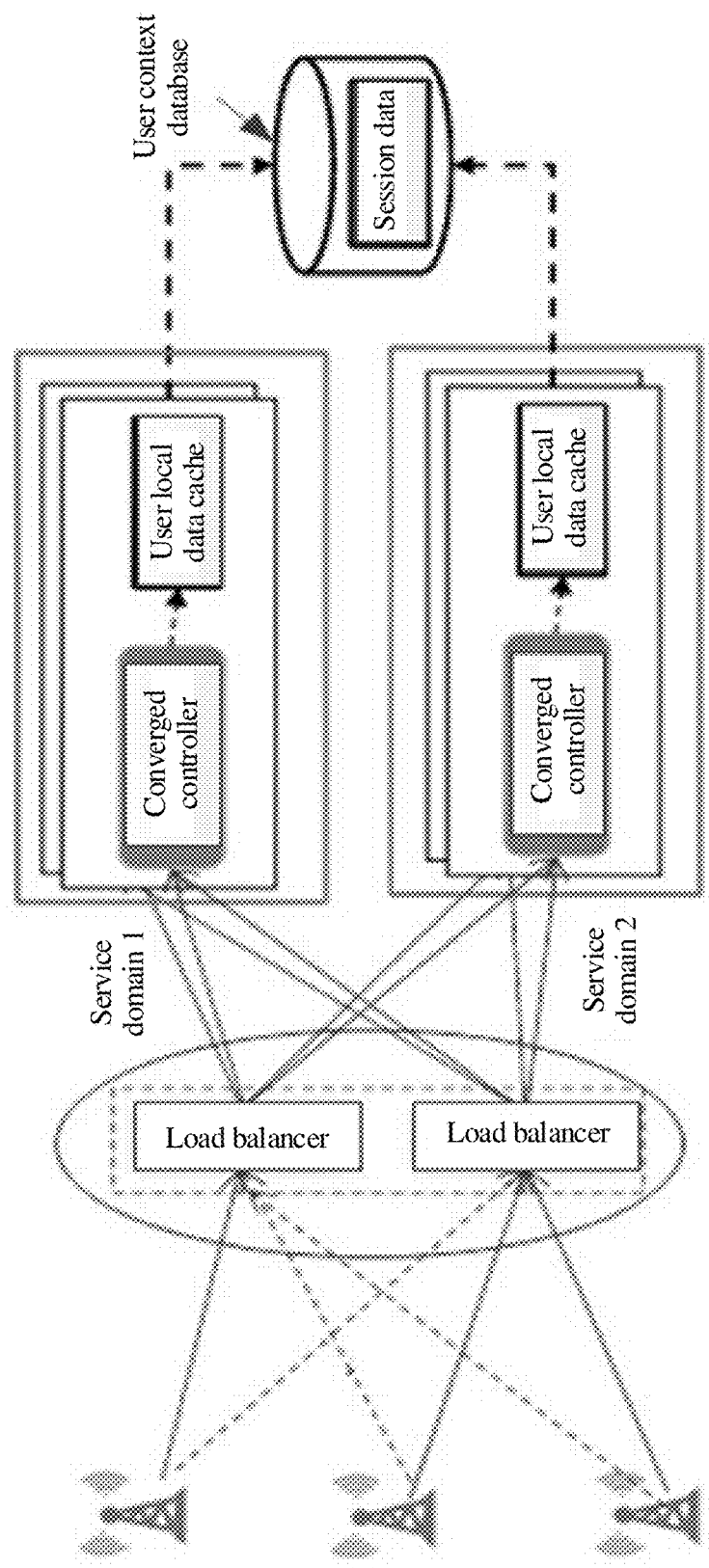
FIG. 5 is a schematic diagram of a system according to an embodiment of the present disclosure.

In specific implementation, as shown in FIG. 5, the network element selector removes the service chain head, and forwards the request message carrying the information about the UE to the converged controller providing a service, so that the converged controller providing a service receives the request message forwarded by the network element selector, and instructs, by analyzing the information about the UE, the base station to provide a service. Specifically, the converged controller providing a service may establish a context for the UE in Local Data Cache of a corresponding service domain, and obtains related data of the UE from a DB Server. The DB Server stores session data. Different converged controllers may have different service domains. In FIG. 5, a service domain 1 may include at least one converged controller, and a service domain 2 may include at least one converged controller other than the converged controller of the service domain 1.

In specific implementation, the converged controller providing a service sends a response message related to the UE to the network element selector, and the network element selector forwards the response message to the base station, so that the base station learns that the converged controller determined by the network element selector serves the UE.

In a possible implementation, the response message may be Controller S1-AP UE ID, and Controller S1-AP UE ID is used as the session index. The base station reads Controller S1-AP UE ID to obtain the session index, and further stores the session index as the context of the UE, so as to continue an interaction process of the UE.

In a possible implementation, a GUTI parameter that is allocated by the controller providing the service to the UE or a controller identifier (Controller ID) may be used as the session index. The UE notifies the base station, and therefore, the base station obtains a session index providing a service, and further stores the session index as the context of the UE, so as to continue the interaction process of the UE.

According to this embodiment of the present disclosure, the network element selector receives the request message sent by the base station, where the request message includes the information about the user equipment UE and the service chain head, the service chain head includes the session index, and the session index is empty or the session index is allocated by the first controller serving the UE; the network element selector determines, based on the session index, the controller providing the service; and the network element selector sends the request message to the controller providing the service, so that the controller providing the service serves the UE. An independent network element selector is a network element of a core network, and has relatively low costs in obtaining a current attribution condition of each controller. Therefore, system consumption can be reduced to support more dynamic and flexible controller load balance for all core networks.

Figure 6A:
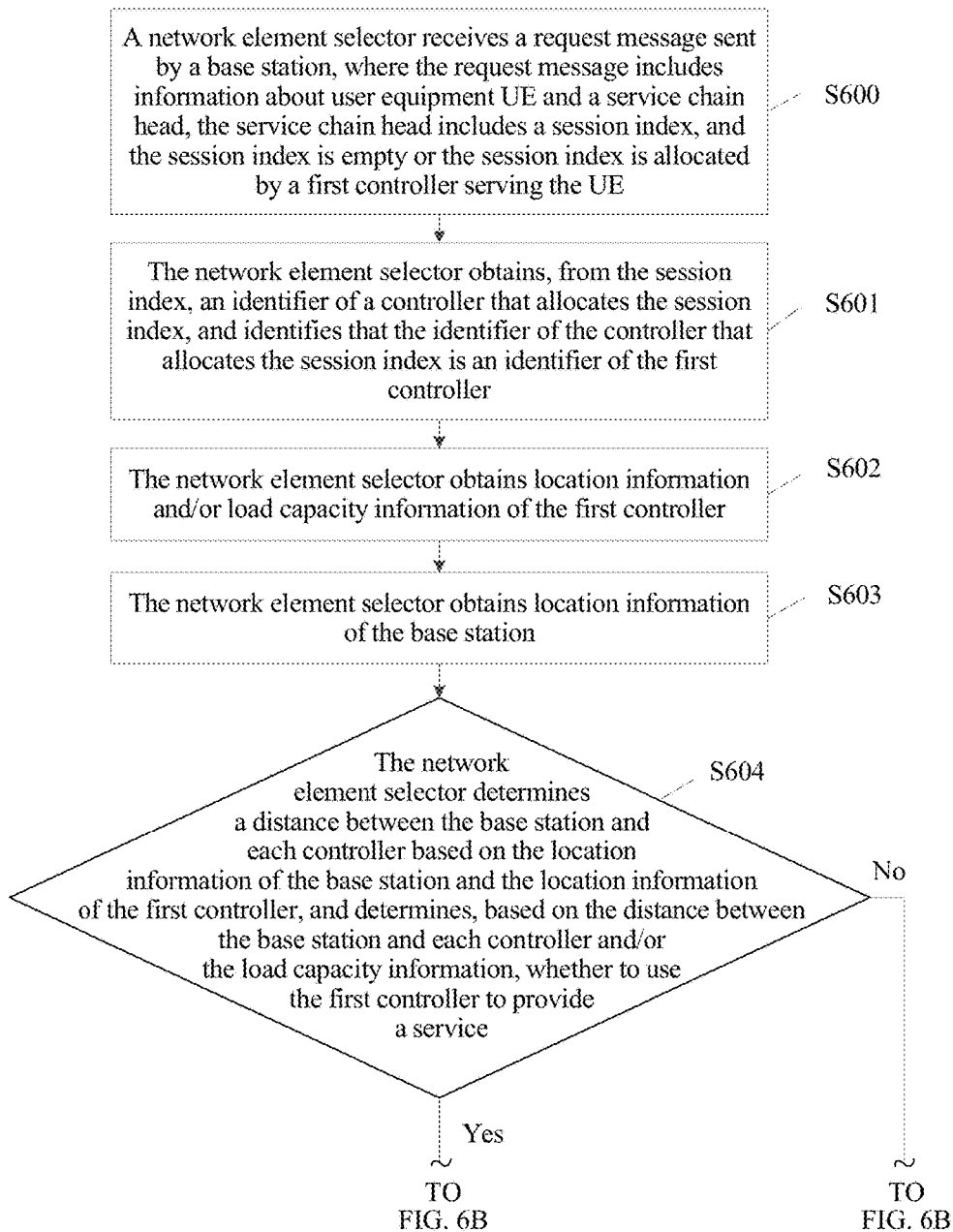
FIG. 6A and FIG. 6B are a schematic flowchart of a network element selection method according to an embodiment of the present disclosure.
Figure 6B:
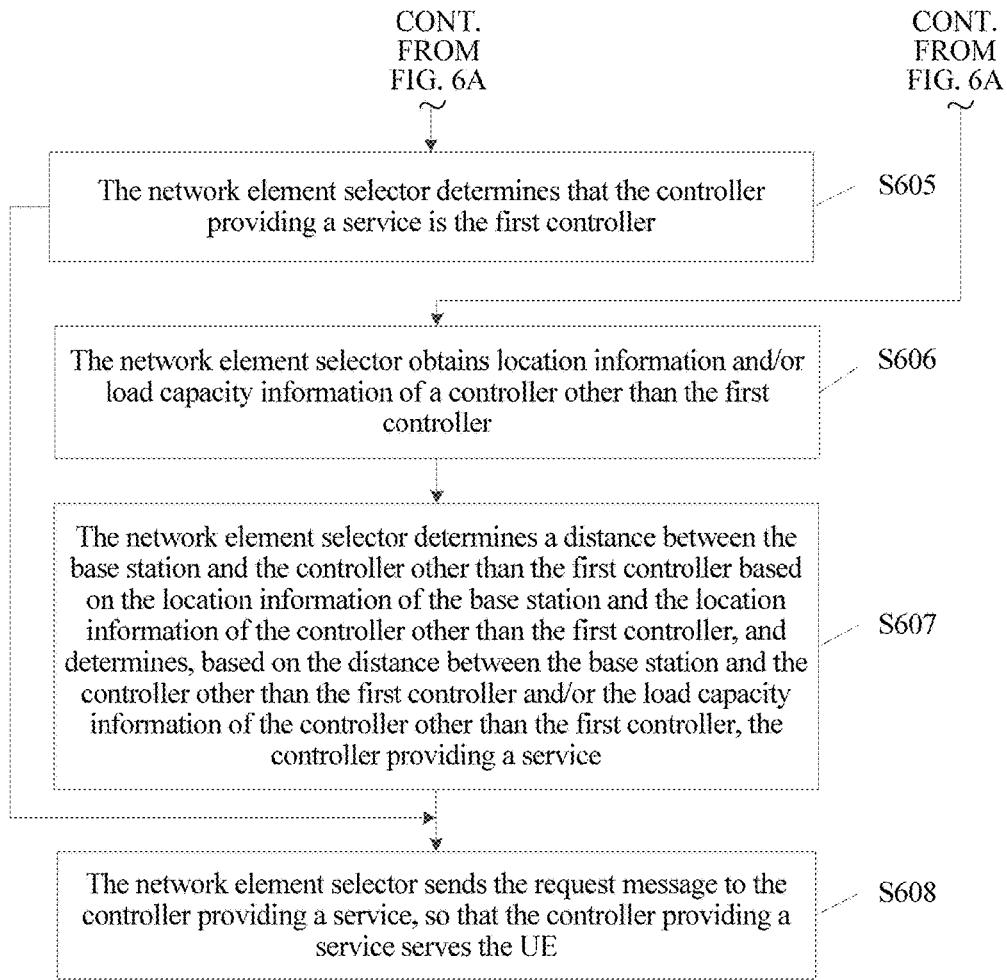

Referring to FIG. 6A and FIG. 6B, FIG. 6A and FIG. 6B are a schematic flowchart of a network element selection method according to an embodiment of the present disclosure. The embodiments of the present disclosure are applicable to requests that are periodically sent after UE is connected or an MME is connected. However, in this embodiment, requests that are periodically sent after the UE is connected to the MME are used as an example for description.

S600. A network element selector receives a request message sent by a base station, where the request message includes information about user equipment (UE) and a service chain head, the service chain head includes a session index, and the session index is empty or the session index is allocated by a first controller serving the UE.

In specific implementation, the UE sends a request to the base station, and the request may be non-access stratum (NAS) signaling. For example, the base station reads a globally unique temporary UE identity (GUTI) parameter by using the NAS signaling, or identifies a Controller ID of the first controller by using Controller S1-AP UE ID that is sent by a network element selector and that is stored in advance. The first controller is a converged controller previously serving the UE. The base station carries the identifier of the first controller in the service chain head, and generates the request message based on the service chain head and the NAS signaling sent by the UE. Finally, the base station sends the request message to the network element selector, and this is not limited in this embodiment.

In a possible implementation, the session index is allocated by the first controller serving the UE, and therefore, an identifier that is stored in the session index and that is of a controller allocating the session index is the identifier of the first controller.

S601. The network element selector obtains, from the session index, an identifier of a controller that allocates the session index, and identifies that the identifier of the controller that allocates the session index is an identifier of the first controller.

In specific implementation, after receiving the request message, the network element selector identifies the identifier of the first controller from a Service Path ID field in the service chain head of the request message, and it indicates that a converged controller currently serving the UE is the first controller.

S602. The network element selector obtains location information and/or load capacity information of the first controller.

In specific implementation, the converged controller currently serving the UE is the first controller, and therefore, the network element selector may obtain the location information and/or the load capacity information of the first controller, so as to obtain a location deployment condition and/or a load condition of the first controller. The network element selector may use the location information of the first controller to determine the converged controller serving the UE, and may obtain a specific location of the first controller by obtaining the location information of the first controller. The network element selector may further use the load capacity information of the first controller to determine the load condition of the first controller, and may learn a current load pressure of the first controller by using the load condition, so as to identify whether the first controller is faulty. If the first controller is faulty, the first controller is shielded. The network element selector may further collectively use the location information and the load capacity information of the first controller to determine whether the first controller can continue to serve the UE.

S603. The network element selector obtains location information of the base station.

In specific implementation, to determine whether the first controller can continue to serve the UE, the network element selector further needs to obtain the location information of the base station, so as to determine an actual physical distance between the base station and the first controller.

S604. The network element selector determines a distance between the base station and each controller based on the location information of the base station and the location information of the first controller, and determines, based on the distance between the base station and each controller and/or the load capacity information, whether to use the first controller to provide the service.

In specific implementation, the network element selector calculates, based on the location information of the base station and the location information of the first controller, the actual physical distance between the base station and the first controller, and determines, based on the actual physical distance between the base station and the first controller and/or the load capacity information of the first controller, whether the first controller can continue to serve the UE. If it is determined that the first controller can continue to serve the UE, step S605 is performed; or it is determined that the first controller cannot continue to serve the UE, step S606 is performed.

S605. The network element selector determines that the controller providing the service is the first controller.

In specific implementation, if the network element selector determines, based on the actual physical distance between the base station and the first controller and/or the load capacity information of the first controller, that the first controller is still a most appropriate converged controller serving the UE, it is determined that the first controller can continue to serve the UE.

S606. The network element selector obtains location information and/or load capacity information of a controller other than the first controller.

In specific implementation, the network element selector determines, based on the actual physical distance between the base station and the first controller and/or the load capacity information of the first controller, that the first controller is not appropriate to serve the UE. The first controller belongs to a service domain, the network element selector is independent of the service domain, and each converged controller belongs to different service domains. Therefore, the network element selector may shield the first controller, and obtains location information and/or load capacity information of a converged controller other than the first controller, so as to obtain a location deployment condition and/or a load condition of another converged controller.

S607. The network element selector determines a distance between the base station and the controller other than the first controller based on the location information of the base station and the location information of the controller other than the first controller, and determines, based on the distance between the base station and the controller other than the first controller and/or the load capacity information of the controller other than the first controller, the controller providing the service.

In specific implementation, the network element selector calculates, based on the location information of the base station and location information of another converged controller, an actual physical distance between the base station and the another converged controller, and determines, from another converged controller based on the actual physical distance between the base station and the another converged controller and/or load capacity information of the another converged controller, the converged controller serving the UE.

S608. The network element selector sends the request message to the controller providing the service, so that the controller providing the service serves the UE.

In specific implementation, when the network element selector determines that the converged controller providing a service is still the first controller, the network element selector removes the service chain head, and forwards NAS signaling to the first controller, so that the first controller receives the NAS signaling forwarded by the network element selector, and instructs, by analyzing the NAS signaling, the base station to provide a service. Specifically, the first controller may update, in Local Data Cache of a corresponding service domain, a context of the UE and related data of the UE obtained from DB Server. The first controller further sends a response message related to the UE to the network element selector, and the network element selector forwards the response message to the base station, so that the base station learns that the first controller continues to serve the UE. For a specific process in which the base station obtains the session index, refer to step S407 of the embodiment in FIG. 4. Details are not described again in this embodiment.

In specific implementation, when the network element selector determines that the converged controller providing a service is a converged controller (for example, a second controller) in another converged controller, the network element selector removes the service chain head, and forwards the NAS signaling to the second controller, so that the second controller receives the NAS signaling forwarded by the network element selector, and instructs, by analyzing the NAS signaling, the base station to provide a service. Specifically, the second controller may store, in Local Data Cache of a corresponding service domain, the session index as the context of the UE, and obtain the related data of the UE from DB Server. The second controller allocates a new GUTI parameter to the UE, initiates a GUTI re-allocation command, and sends the GUTI re-allocation command and Controller S1-AP UE ID related to the second controller to the network element selector. The network element selector forwards the GUTI re-allocation command and Controller S1-AP UE ID related to the second controller to the base station, so that the base station learns that the second controller continues to serve the UE. Controller S1-AP UE ID includes an identifier of the second controller. The base station learns, by reading Controller S1-AP UE ID, that the converged controller providing a service has been changed to the second controller, and updates, based on the received GUTI re-allocation command, a GUTI parameter that is stored in advance, updates the session index, and changes the identifier of the first controller to the identifier of the second controller, so as to continue an interaction process of the UE. Alternatively, the GUTI parameter allocated by the second controller to the UE or the identifier of the second controller (Controller ID) may be used as the session index. The UE notifies the base station, and therefore, the base station obtains the session index to update the context of the UE, and continue the interaction process of the UE.

According to this embodiment of the present disclosure, the base station sends the NAS signaling to the network element selector, and the network element selector reads a value of Controller ID in the service chain head as the identifier of the first controller. If it is found that the first controller is not appropriate to continue to provide a service, for example, the first controller is overloaded or faulty, it is determined that a new converged controller is selected for the UE, and signaling is forwarded. The new converged controller may initiate a GUTI re-allocation process, and continue the interaction process to provide an uninterrupted service for the UE, so as to implement a session holding function.

Figure 7:
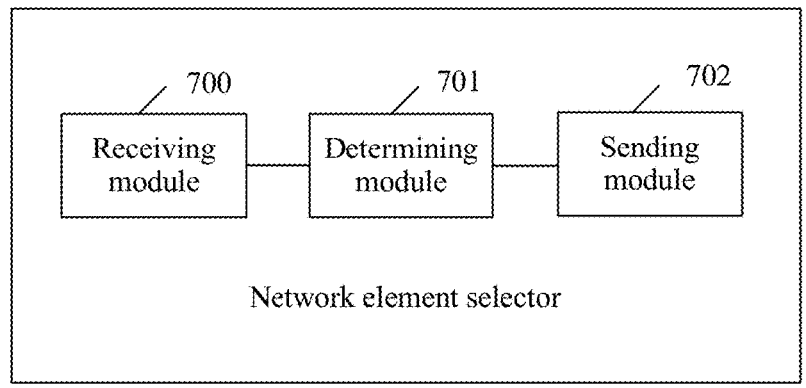
FIG. 7 is a schematic structural diagram of a network element selector according to an embodiment of the present disclosure.

Referring to FIG. 7, FIG. 7 is a schematic structural diagram of a network element selector according to an embodiment of the present disclosure. As shown in FIG. 7, the network element selector includes a receiving module 700, a determining module 701, and a sending module 702.

The receiving module 700 is configured to receive a request message sent by a base station, where the request message includes information about user equipment UE and a service chain head, the service chain head includes a session index, and the session index is empty or the session index is allocated by a first controller serving the UE.

The determining module 701 is configured to determine, based on the session index received by the receiving module 700, a controller providing a service.

The sending module 702 is configured to send the request message received by the receiving module to the controller that is determined by the determining module 701 and that provides a service, so that the controller providing the service serves the UE.

Figure 8:
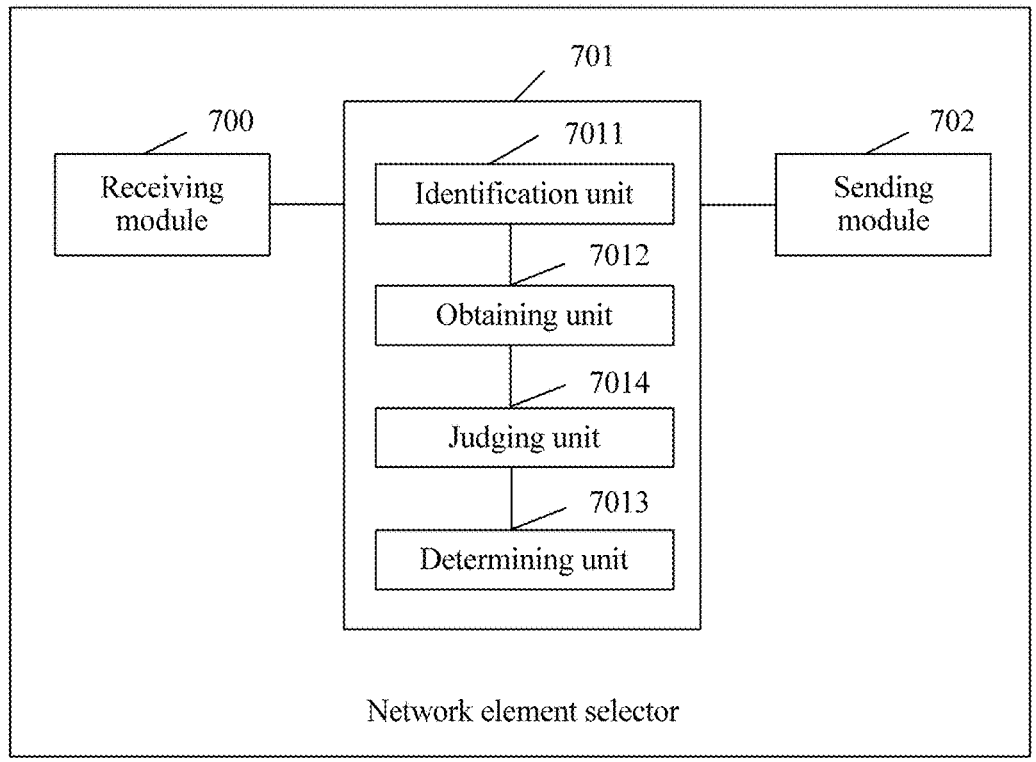
FIG. 8 is another schematic structural diagram of a network element selector according to an embodiment of the present disclosure.

In a possible implementation, as shown in FIG. 8, the determining module 701 includes an identification unit 7011 and a determining unit 7013.

The identification unit 7011 is configured to: obtain, from the session index, an identifier of a controller that allocates the session index, and identify that the identifier of the controller that allocates the session index is an identifier of the first controller.

The determining unit 7013 is configured to determine that the controller providing the service is the first controller.

In a possible implementation, the determining module is configured to:

determine, based on the session index and attribute information of each controller, the controller providing the service, where the attribute information of each controller is location information and/or load capacity information of each controller.

In a possible implementation, as shown in FIG. 8, the determining module 701 further includes an obtaining unit 7012.

The identification unit 7011 is further configured to identify that the session index is empty.

The obtaining unit 7012 is configured to obtain the location information and/or the load capacity information of each controller.

The obtaining unit 7012 is further configured to obtain location information of the base station.

The determining unit 7013 is configured to: determine a distance between the base station and each controller based on the location information of the base station and the location information of each controller, and determine, based on the distance between the base station and each controller and/or the load capacity information, the controller providing the service.

In a possible implementation, as shown in FIG. 8, the determining module 701 further includes a judging unit 7014.

The identification unit 7011 is further configured to: obtain, from the session index, an identifier of a controller that allocates the session index, and identify that the identifier of the controller that allocates the session index is an identifier of the first controller.

The obtaining unit 7012 is further configured to obtain location information and/or load capacity information of the first controller.

The obtaining unit 7012 is further configured to obtain location information of the base station.

The judging unit 7014 is configured to: determine a distance between the base station and each controller based on the location information of the base station and the location information of the first controller, and determine, based on the distance between the base station and each controller and/or the load capacity information, whether to use the first controller to provide the service.

The determining unit 7013 is further configured to: when a judgment result of the judging unit 7014 is to use the first controller to provide the service, determine that the controller providing the service is the first controller.

The obtaining unit 7012 is further configured to: when the judgment result of the judging unit 7014 is not to use the first controller to provide the service, obtain location information and/or load capacity information of a controller other than the first controller.

The determining unit 7013 is further configured to: determine a distance between the base station and the controller other than the first controller based on the location information of the base station and the location information of the controller other than the first controller, and determine, based on the distance between the base station and the controller other than the first controller and/or the load capacity information of the controller other than the first controller, the controller providing the service.

According to this embodiment of the present disclosure, the network element selector receives the request message sent by the base station, where the request message includes the information about the user equipment UE and the service chain head, the service chain head includes the session index, and the session index is empty or the session index is allocated by the first controller serving the UE; the network element selector determines, based on the session index, the controller providing the service; and the network element selector sends the request message to the controller providing the service, so that the controller providing the service serves the UE. An independent network element selector is a network element of a core network, and has relatively low costs in obtaining a current attribution condition of each controller. Therefore, system consumption can be reduced to support more dynamic and flexible controller load balance for all core networks.

Figure 9:
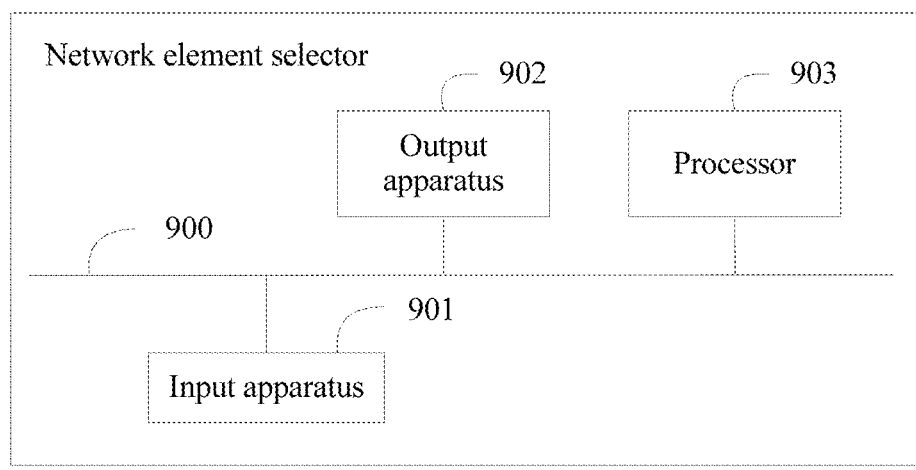
FIG. 9 is another schematic structural diagram of a network element selector according to an embodiment of the present disclosure.

Referring to FIG. 9, FIG. 9 is another schematic structural diagram of a network element selector according to an embodiment of the present disclosure. For specific steps implemented by each apparatus in this embodiment of the present disclosure, refer to embodiments shown in FIG. 2 to FIG. 6A and FIG. 6B. Details are not described in this embodiment of the present disclosure. As shown in FIG. 9, a mobile terminal of this embodiment includes a communications bus 900, an input apparatus 901, an output apparatus 902, and a processor 903 (there may be one or more processors 903 in a network element selector, and one processor is used as an example for description in FIG. 9).

The communications bus 900 is configured to implement connection and communication between the input apparatus, the output apparatus, and the processor 903.

The input apparatus 901 is configured to receive a request message sent by a base station, where the request message includes information about user equipment UE and a service chain head, the service chain head includes a session index, and the session index is empty or the session index is allocated by a first controller serving the UE.

The processor 903 is configured to determine, based on the session index, a controller providing a service.

The output apparatus 902 is configured to send the request message to the controller providing the service, so that the controller providing the service serves the UE.

In a possible implementation, that the processor 903 determines, based on the session index, a controller providing a service includes the following:

obtaining, from the session index, an identifier of a controller that allocates the session index, and identifying that the identifier of the controller that allocates the session index is an identifier of the first controller; and determining that the controller providing the service is the first controller.

In a possible implementation, that the processor 903 determines, based on the session index, a controller providing a service includes the following:

determining, based on the session index and attribute information of each controller, the controller providing the service, where the attribute information of each controller is location information and/or load capacity information of each controller.

In a possible implementation, that the processor 903 determines, based on the session index and attribute information of each controller, the controller providing the service includes the following:

identifying that the session index is empty;
obtaining the location information and/or the load capacity information of each controller;
obtaining location information of the base station; and
determining a distance between the base station and each controller based on the location information of the base station and the location information of each controller, and determining, based on the distance between the base station and each controller and/or the load capacity information, the controller providing the service.

In a possible implementation, that the processor 903 determines, based on the session index and attribute information of each controller, the controller providing the service includes the following:

obtaining, from the session index, an identifier of a controller that allocates the session index, and identifying that the identifier of the controller that allocates the session index is an identifier of the first controller;
obtaining location information and/or load capacity information of the first controller;
obtaining location information of the base station;
determining a distance between the base station and each controller based on the location information of the base station and the location information of the first controller, and determining, based on the distance between the base station and each controller and/or the load capacity information, whether to use the first controller to provide the service; and if it is determined to use the first controller to provide a service, determining that the controller providing the service is the first controller; or if it is determined not to use the first controller to provide a service, obtaining location information and/or load capacity information of a controller other than the first controller; and determining a distance between the base station and the controller other than the first controller based on the location information of the base station and the location information of the controller other than the first controller, and determining, based on the distance between the base station and the controller other than the first controller and/or the load capacity information of the controller other than the first controller, the controller providing the service.

According to this embodiment of the present disclosure, the network element selector receives the request message sent by the base station, where the request message includes the information about the user equipment UE and the service chain head, the service chain head includes the session index, and the session index is empty or the session index is allocated by the first controller serving the UE; the network element selector determines, based on the session index, the controller providing the service; and the network element selector sends the request message to the controller providing the service, so that the controller providing the service serves the UE. An independent network element selector is a network element of a core network, and has relatively low costs in obtaining a current attribution condition of each controller. Therefore, system consumption can be reduced to support more dynamic and flexible controller load balance for all core networks.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The above description merely includes examples of embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A network element selection method comprising:
   receiving, by a network element selector, a request message from a base station,
      wherein the request message comprises information about user equipment (UE) and a service chain head, which comprises a session index;
   obtaining, by the network element selector, from the session index, an identifier of a first controller that allocates the session index,
   identifying, by the network element selector, the first controller from the identifier;
   obtaining, by the network element selector, attribution information of the controller and the base station, including one or more of a distance between the first controller and the base station and load information for the first controller;
   determining, by the network element selector, based on the obtained attribute information, whether to use the first controller to provide the service;
   obtaining, by the network element selector, attribute information of a second controller if it is determined not to use the first controller to provide the service, including one or more of a distance between the base station and the second controller and load information of the second controller;
   determining, by the network element selector, based on the obtained attribute information of the second controller, whether the first or second controller should provide the service; and
   sending, by the network element selector, the request message to the first or second controller providing the service, so that the first or second controller providing the service serves the UE.

2. The network element selection method according to claim 1, wherein determining the first or second controller comprises:
   identifying, by the network element selector, that the session index is zero; and
   determining, by the network element selector, based on the distance between the base station and each of the first and second controllers and the load capacity information of each of the first and second controllers, the first or second controller providing the service.

3. The network element selection method according to claim 1, wherein determining the first or second controller comprises:
   identifying, by the network element selector, that the session index is zero empty; and
   determining, based on the load capacity information of each of the first and second controllers, the first or second controller providing the service.

4. The network element selection method according to claim 1, wherein determining the first or second controller comprises:
   identifying, by the network element selector, that the session index is zero; and
   determining, by the network element selector, based on the distance between the base station and each of the first and second controllers, the first or second controller providing the service.

5. The network element selection method according to claim 1, wherein determining the first or second controller comprises:
   determining, by the network element selector based on the load capacity information of the first controller, whether to use the first controller to provide the service; and
   if it is determined to use the first controller to provide the service, determining, by the network element selector, that the first controller provides the service; or
   if it is determined not to use the first controller to provide the service, determining, by the network element selector based on the load capacity information of the second controller, the first or second controller provides the service.

6. The network element selection method according to claim 1, wherein the attribute information of each of the first and second controllers comprises at least one of the location information, the distance between the base station and first or second controller and load capacity information of each controller.

7. A network element selector comprising a communications bus, an input apparatus, an output apparatus, and a processor, wherein
   the input apparatus, the output apparatus, and the processor are connected by the communications bus;
   the input apparatus is configured to cooperate with the processor to receive a request message from a base station,
      wherein the request message comprises information about user equipment (UE) and a service chain head, which comprises a session index;
   the processor is configured to provide the following operations:
      obtaining, from the session index, an identifier of a first controller that allocates the session index,
      identifying the first controller from the identifier;
      obtaining attribution information of the controller and the base station, including one or more of a distance between the first controller and the base station and load information for the first controller;

determining, based on the obtained attribute information, whether to use the first controller to provide the service;

obtaining attribute information of a second controller if it is determined not to use the first controller to provide the service, including one or more of a distance between the base station and the second controller and load information of the second controller;

determining based on the obtained attribute information of the second controller, whether the first or second controller should provide the service; and the output apparatus is configured to cooperate with the processor to send the request message to the first or second controller providing the service, so that the first or second controller providing the service serves the UE.

8. The network element selector according to claim 7, wherein when determining the first or second controller providing the service, the processor is further configured to:
identify that the session index is zero; and
determine, based on the distance between the base station and each of the first and second controllers and the load capacity information, the first or second controller providing the service.

9. The network element selector according to claim 7, wherein when determining whether the first or second controller is providing the service, the processor is further configured to:
identify that the session index is zero; and
determine, based on the load capacity information, the controller providing the service.

10. The network element selector according to claim 7, wherein when determining whether the first or second controller is providing the service, the processor is further configured to:
identify that the session index is zero
and
determine, based on the distance between the base station and each of the first and second controllers, the first or second controller providing the service.

11. The network element selector according to claim 7, wherein when determining the first or second controller providing the service, the processor is further configured to:
obtain load capacity information of the first controller as part of the attribute information of the first controller;
determine, based on the load capacity information of the first controller, whether to use the first controller to provide the service;
if it is determined not to use the first controller to provide the service, obtain load capacity information of the second controller as part of the attribute information of the first controller; and determine, based on the load capacity information of the second controller, whether the first or second controller provides the service.

12. The network element selector according to claim 7, wherein the attribute information of each of the first and second controllers comprises at least one of the location information, the distance between the base station and the first or second controller and load capacity information of each controller.

13. A non-transitory computer-readable medium storing computer instructions for execution by one or more processors, wherein the computer instructions instruct the one or more processors to perform the operations of:
receiving a request message from a base station,
wherein the request message comprises information about user equipment (UE) and a service chain head, which comprises a session index;
obtaining from the session index, an identifier of a first controller that allocates the session index,
identifying the first controller from the identifier;
obtaining attribution information of the controller and the base station, including one or more of a distance between the first controller and the base station and load information for the first controller;
determining based on the obtained attribute information, whether to use the first controller to provide the service;
obtaining attribute information of a second controller if it is determined not to use the first controller to provide the service, including one or more of a distance between the base station and the second controller and load information of the second controller;
determining based on the obtained attribute information of the second controller, whether the first or second controller should provide the service; and
sending the request message to the first or second controller providing the service, so that the first or second controller providing the service serves the UE.

14. The non-transitory computer-readable medium according to claim 13, wherein the operation of determining the controller comprises:
identifying that the session index is zero;
and
determining, based on the distance between the base station and each of the first and second controllers and the load capacity information of each of the first and second controllers, the first or second controller providing the service.

15. The non-transitory computer-readable medium according to claim 13, wherein the-attribute information of each of the first and second controllers comprises at least one of the location information, the distance between the base station and the first or second controller and load capacity information of each controller.

* * * * *

UNITED STATES PATENT AND TRADEMARK OFFICE
CERTIFICATE OF CORRECTION

PATENT NO. : 10,349,344 B2
APPLICATION NO. : 16/002023
DATED : July 9, 2019
INVENTOR(S) : Li et al.

Page 1 of 1

It is certified that error appears in the above-identified patent and that said Letters Patent is hereby corrected as shown below:

In the Claims

Claim 3, Column 20, Line 13, "session index is zero empty; and" should read -- session index is zero; and --.

Signed and Sealed this
Twenty-fifth Day of February, 2020

Andrei Iancu
*Director of the United States Patent and Trademark Office*